United States Patent [19]

Osborne et al.

[11] Patent Number: 5,637,282
[45] Date of Patent: Jun. 10, 1997

[54] NITROGEN OXIDE SCRUBBING WITH ALKALINE PEROXIDE SOLUTION

[75] Inventors: William E. Osborne; Andrew J. Bomber, both of Vancouver, Wash.; Mitchell L. Gee, Tualatin, Oreg.; Bill C. Pesklak, Vancouver, Wash.; Frank A. Dick, Portland, Oreg.; Ellen Park; Carla E. Yetter, both of Vancouver, Wash.; Allen R. Boyce, Portland, Oreg.

[73] Assignee: SEH America, Inc., Vancouver, Wash.

[21] Appl. No.: 629,779

[22] Filed: Apr. 9, 1996

[51] Int. Cl.$^6$ .................................................. C01B 21/00
[52] U.S. Cl. .................................................. 423/235; 423/210
[58] Field of Search ............................. 423/235, 210, 423/212

[56] References Cited

U.S. PATENT DOCUMENTS

| | | | |
|---|---|---|---|
| 4,425,313 | 1/1984 | Cooper | 423/235 |
| 5,064,625 | 11/1991 | Curtius | 423/235 |
| 5,112,587 | 5/1992 | von Wedel et al. | 423/235 |
| 5,397,549 | 3/1995 | Newman | 423/235 |

OTHER PUBLICATIONS

Rossi, "How to Control NO$_x$," *Pollution Engineering*, Apr. 1995, pp. 50-52 Apr. 1995.

Kasper et al., "Control of Nitrogen Oxide Emissions by Hydrogen Peroxide-Enhanced Gas-Phase Oxidation of Nitric Oxide," 46 *J. Air & Waste Mgt. Assoc.* 127 (1996).

*Primary Examiner*—Deborah Jones
*Assistant Examiner*—Amy M. Harding
*Attorney, Agent, or Firm*—Chernoff, Vilhauer, McClung & Stenzel

[57] ABSTRACT

A nitrogen oxide scrubbing process comprises the step of contacting effluent containing nitrogen oxide with an aqueous alkaline peroxide solution. The process may take place in scrubbing towers where the aqueous solution flows countercurrent to the effluent.

9 Claims, 1 Drawing Sheet

NITROGEN OXIDE SCRUBBING WITH ALKALINE PEROXIDE SOLUTION

This invention relates to the removal of nitrogen oxides from effluents, and principally to their removal from off-gases by wet scrubbing.

BACKGROUND OF THE INVENTION

Under the 1990 Clean Air Act Amendment, two regulated air pollutants are sulfur dioxide ($SO_2$) and nitrogen oxides ($NO_x$ where x=1 or 2). Most of the $SO_2$ control technology used in the United States is lime or limestone wet scrubbing. $NO_x$ currently cannot be removed effectively in these scrubbing systems due to the low solubility of nitric oxide (NO), the major constituent of $NO_x$ in combustion flue gases. Another major source of $NO_x$ gas is nitric acid pickling or etching, such as are used in the steel and semiconductor industries.

A number of methods of controlling $NO_x$ are known, but all suffer from a variety of drawbacks. Known methods include catalytic reduction with ammonia, scrubbing with NaOH, and scrubbing with NASH (sodium hydrosulfide). The principal drawbacks to catalytic $NH_3$ reduction are extremely high capital costs and the required use of anhydrous $NH_3$, a hazardous gas. Scrubbing with NaOH leads to the production of nitrates and nitrites, which must be removed and disposed of separately. Scrubbing with NaSH can lead to the production of reduced sulfur compounds, requiring separate removal disposal, and NaSH is itself classified as a hazardous chemical.

Rossi, in "How to Control $NO_x$," *Pollution Engineering*, pp. 50–52 (April 1995), reported the use of an aqueous solution of $H_2O_2$ for scrubbing $NO_x$-containing off gas, and suggested the use of $H_2O_2$ added directly to the process that uses nitric acid, such as in a stainless steel pickling process, so as to react instantaneously with the precursor of $NO_x$, nitrous acid (HNO), before the HNO decomposes to NO and $NO_2$. Kasper et al., in "Control of Nitrogen Oxide Emissions by Hydrogen Peroxide-Enhanced Gas-Phase Oxidation of Nitric Oxide," 46 *J. Air & Waste Mgt. Assoc.* 127 (1996), suggests gas phase oxidation of $NO_x$ to $HNO_3$ at high temperatures by an acidic solution of $H_2O_2$, followed by removal of the $HNO_3$ in an alkaline solution. U.S. Pat. No. 5,397,549 discloses a process for removal of sulfur dioxide and nitrogen oxides from flue gases comprising cooling the flue gas, oxidizing the sulfur and nitrogen oxides to their highest valency states, and contacting the oxidized gas with calcium hydroxide and $H_2O_2$ while maintaining the pH in the range of 4.5 to 5.5 to drive off $CO_2$. U.S. Pat. No. 5,112,587 discloses a method for the removal of $NO_x$ comprising the gas phase catalytic treatment with $H_2O_2$ to obtain $HNO_3$.

There is still a need for a safe, inexpensive and efficient method of controlling nitrogen oxide emissions. This need and others are met by the present invention, which is summarized and described in detail below.

SUMMARY OF THE INVENTION

The invention comprises a method of removing nitrogen oxides from effluents containing the same, the key step of which is contacting the effluent with an aqueous alkaline peroxide-containing scrubber solution.

DETAILED DESCRIPTION OF PREFERRED EMBODIMENTS

Figure 1:
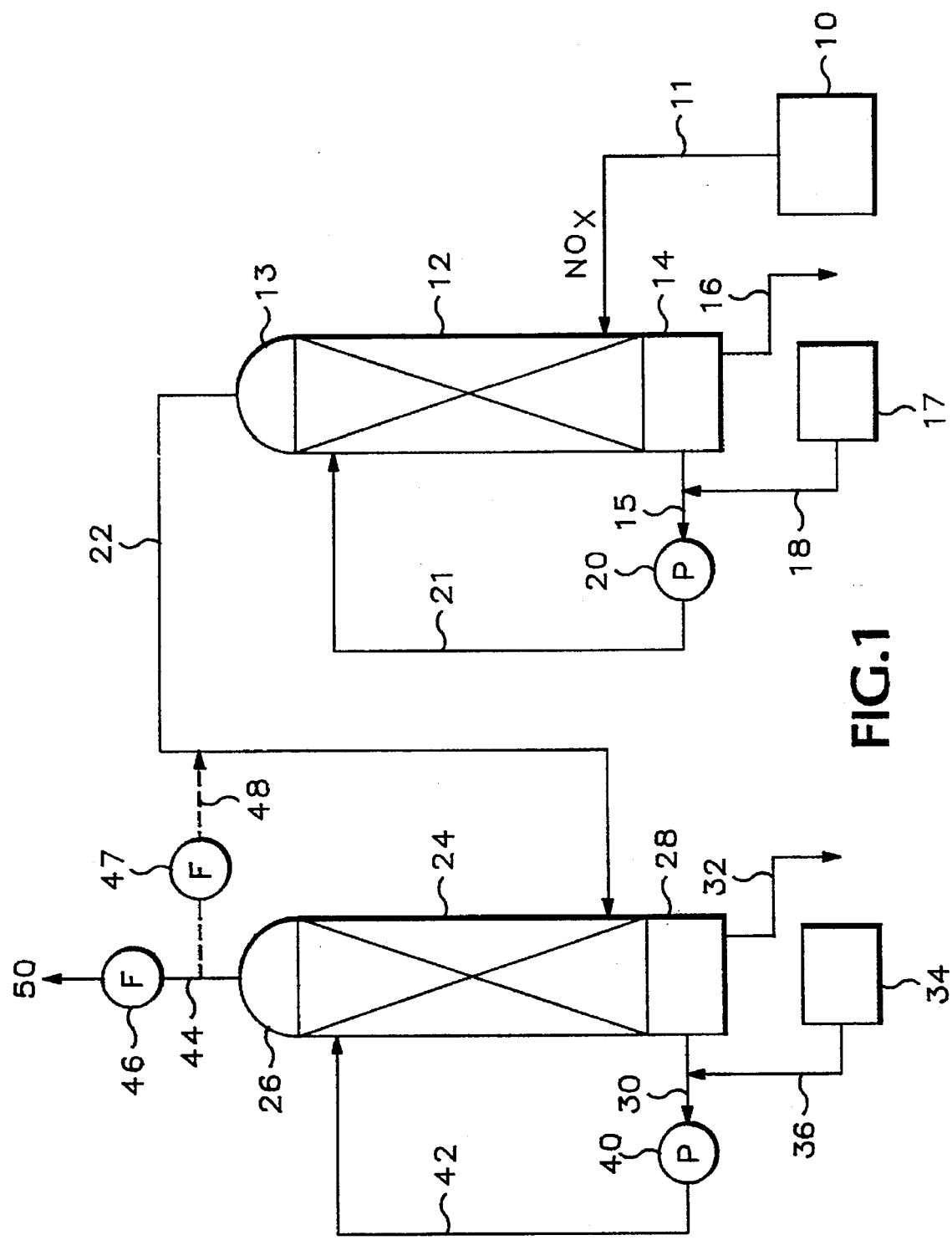
FIG. 1 is a schematic of an exemplary process of treating the $NO_x$-containing off-gas from a nitric acid etching manufacturing step.

In its most fundamental aspect, the present invention comprises contacting an $NO_x$-containing effluent with a liquid scrubber solution that is alkaline and contains peroxide. Although not wishing to be bound by any theory as to why the method is so efficient in the removal of nitrogen oxides, the presence of alkali appears to degrade peroxide in solution, making the peroxide more reactive. The chemistry is believed to involve the following reactions, taking the peroxide to be $H_2O_2$ and the source of alkaline to be NaOH:

$$NO + H_2O_2 \rightarrow NO_2 + H_2O$$
$$2NO + O_2 \rightarrow 2NO_2$$
$$2NO + 3H_2O_2 \rightarrow 2HNO_3 + 2H_2O$$
$$2NO_2 + H_2O \leftarrow \rightarrow HNO_2 + HNO_3$$
$$2NO_2 + H_2O_2 \rightarrow 2HNO_3$$
$$HNO_2 + NaOH \rightarrow NaNO_2 + H_2O$$
$$HNO_2 + H_2O_2 \rightarrow HNO_3 + H_2O$$
$$2HNO_3 + NO \rightarrow 3NO_2 + H_2O$$
$$NO_2 + NaOH \leftarrow \rightarrow NaNO_2 + OH-$$
$$NaNO_2 + H_2O_2 \rightarrow NaNO_3 + H_2O$$

The scrubbing process of the present invention may be conducted at a wide range of temperatures, including a range of 15° to 75° C., but for economic reasons, is preferably conducted at ambient temperatures. The flow of the scrubber solution relative to the $NO_x$-containing effluent may be by misting, crosscurrent, co-current or countercurrent, with countercurrent flow being preferred, and the scrubbing may be conducted in scrubbing towers of conventional design. In a typical application where the effluent is in the form of a gas, the flow rate may be at virtually any rate, but is preferably in excess of about 50 cubic feet per minute (cfm). In a scaled-up process for scrubbing off gases containing $\leq 1000$ ppm $NO_x$, flow rates of 2000 to 20,000 cfm and up are envisioned.

Average concentrations of alkali and peroxide found necessary to efficiently scrub a typical off-gas containing $NO_x$ are in a range sufficient to maintain a pH of about 8 to about 14 (typically 1–4 wt % alkali) and 0.5–5 wt % peroxide. Although any alkaline or alkaline earth oxide or hydroxide will serve as a source of alkali, NaOH is preferred because of its cost, ready availability and excellent effectiveness in the process of the present invention. The preferred source of peroxide is $H_2O_2$.

In an alternative embodiment, the $NO_x$-containing off gas is pre-scrubbed with an alkaline solution, preferably at a pH of from 8 to 14 and at generally the same gas and scrubber solution flow rates as for the alkaline peroxide scrub. Nitrates and nitrites formed in the pre-scrub are periodically or continuously removed by removing a part of the pre-scrub solution while supplying make-up solution.

Referring now to FIG. 1, there is shown schematically a nitric acid etching process step 10, such as is found in the semiconductor industry, which emits an NO- and/or $NO_2$-containing exhaust via effluent duct 11. This $NO_x$-containing exhaust is optionally fed to the bottom portion of a pre-scrub tower 12 equipped with an overhead portion 13 and a pre-scrub solution sump 14 in its base, the sump 14 containing an aqueous alkaline pre-scrub solution. The pre-scrub solution is pumped by pre-scrub pump 20 via lines 15 and 21 to the top of pre-scrub tower 12 to be distributed by appropriate distribution means (not shown) so as to cascade countercurrent to the rising $NO_x$-containing exhaust. Because of the formation of nitrates and nitrites in pre-scrub tower 12, a portion of the pre-scrub liquor is periodically or continuously directed to waste treatment via blowdown line 16. Make-up liquor is periodically returned to line 15 from make-up tank 17 via line 18 to replenish that directed to waste treatment. The $NO_x$-containing exhaust, purged of acidic components such as $HNO_3$, $HNO_2$, $CH_3COOH$ and HF, as well as some $NO_x$, is then fed via line 22 to the bottom portion of alkaline peroxide scrub tower 24, which is provided with an overhead portion 26 and a scrub solution sump 28 in its base, the sump containing aqueous alkaline peroxide solution. This solution is pumped by scrub pump 40 via lines 30 and 42 to the top of scrub tower 24 to be distributed so as to cascade countercurrent to the rising $NO_x$-containing exhaust. A portion of the spent alkaline peroxide scrub liquor is periodically or continuously directed to waste treatment via blowdown line 32, while make-up liquor is periodically supplied from make-up tank 34 via line 36. The $NO_x$-purged effluent is then either exhausted via line 44 to atmosphere 50 by fan 46 or recycled via exhaust fan 47 and recycle line 48 for further scrubbing to line 22, or fed to yet another $NO_x$ alkaline peroxide scrub tower for still further removal of nitrogen oxides.

scrub solutions were maintained at pH 8 to 14, and at a temperature of 55° to 65° F. and under a vacuum of −5 to −7 inches of water. Virtually all of these acidic components plus some $NO_x$ were removed in the pre-scrub tower by formation of $H_2O$ and the salts $NaNO_3$, $NaNO_2$, NaF, and $NaCH_3COO$, which remained soluble at the pH range mentioned. These salts were periodically removed by blowdown through lines 16 and 32, and make-up scrubber solution was supplied through line 36. The principal components remaining in the exhaust fed to scrub tower 24 were NO and $NO_2$. Example No. 8 was conducted without any pre-scrubbing. The flow rates, make-up of off-gas and aqueous scrubber solutions with concentrations in ppm and wt %, respectively, duration of the runs, and efficiency are reported in the table below.

TABLE

| Ex. No. | Duration (min) | Average [$NO_x$] (ppm) Inlet | Average [$NO_x$] (ppm) Outlet | Gas Flow (cfm) | Liquid Flow (gpm) | Pre-Scrub [NaOH] (%) | Scrub [$H_2O_2$] (%) | Scrub [NaOH] (%) | Average Efficiency (%) |
|---|---|---|---|---|---|---|---|---|---|
| 1 | 43 | 174 | 68 | 100 | 8 | 6 | 1 | 3 | 61 |
| 2 | 35 | 158 | 72 | 100 | 15 | 6 | 1 | 3 | 55 |
| 3 | 35 | 173 | 66 | 100 | 15 | 6 | 4 | 3 | 62 |
| 4 | 40 | 120 | 35 | 50 | 8 | 6 | 1 | 3 | 71 |
| 5 | 25 | 178 | 49 | 50 | 8 | 6 | 4 | 3 | 72 |
| 6 | 22 | 143 | 48 | 50 | 15 | 6 | 1 | 3 | 66 |
| 7 | 25 | 185 | 46 | 50 | 15 | 6 | 4 | 3 | 75 |
| 8 | 420 | 164 | 87 | 250 | 8 | N/A | 0.5 | 3* | 48 |
| C1 | 10 | 147 | 113 | 100 | 15 | 6 | 1 | 0 | 23 |
| C2 | 42 | 134 | 96 | 100 | 15 | 6 | 4 | 0 | 28 |
| C3 | 40 | 103 | 72 | 50 | 8 | 6 | 1 | 0 | 31 |
| C4 | 30 | 111 | 74 | 50 | 8 | 6 | 4 | 0 | 33 |

*Average pH 10.

EXAMPLES 1–8 AND COMPARATIVE EXAMPLES

Pilot-scale nitrogen oxides scrubbing apparatus of substantially the same design shown in FIG. 1 was set up to purge the $NO_x$-containing gaseous effluent from nitric acid etching of semiconductor wafers; the approximate $NO_x$ content was >90% $NO_2$ and <10% NO. Pre-scrub tower 12 was 12 ft high and 1 ft in diameter and contained 264 ft$^2$ of polypropylene packing, a 10 gal sump 14 in its base, a perforated liquid distribution bar and a distribution tray in the top of the tower and a demisting screen in the overhead portion 13. Pre-scrub pump 20 was a 20 gpm diaphragm pump. Exhaust fan 46 had a capacity of 275 cfm. Scrub tower 24 was of essentially the same construction as pre-scrub tower 12. Scrub pump 40 was the same type and having the same capacity as pre-scrub pump 20. All scrubbing liquors were continuously recycled from sumps 14 and 28 to the top of towers 12 and 24, respectively. For comparison, four runs were made (designated C1–C4) using no NaOH in the scrub tower solution.

The exhaust from a nitric acid/hydrofluoric acid semiconductor wafer etching operation, containing air, $HNO_3$, $NO_x$, HF and $CH_3COOH$, was fed at ambient temperature to a pre-scrub tower 12 and then to a scrub tower 24 wherein the As is apparent, those runs using peroxide only as the scrub solution were far less efficient at removing nitrogen oxides.

EXAMPLE 9

Using the data obtained from these pilot runs, the mass transfer coefficient for the scrubbing process was calculated and used in calculating a 98% efficiency of a scaled-up version of the process, assuming two approximately 20-ft-high scrubbing towers, 4.5 ft in diameter with 477 ft$^3$ of polypropylene packing resulting in 40,545 ft$^2$ of surface area, 1000 ppm $NO_x$ in the off gas flowing at 5000 cfm, and a scrubbing liquor at a pH of 8–14 and containing 1 wt % $H_2O_2$ and pumped and continuously recycled at a rate of 160 gpm.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of removing nitrogen oxides from nitrogen oxide-containing gaseous effluent that is substantially carbon dioxide-free said method consisting essentially of contacting said effluent with an aqueous alkaline peroxide-containing scrubber solution at a pH of about 8 to about 14.

2. The method of claim 1 wherein said effluent contains ≧50 ppm $NO_x$ where x=1 or 2.

3. The method of claim 1 wherein said contacting takes place in a series of scrubbing towers.

4. The method of claim 1 wherein said peroxide in said scrubber solution is $H_2O_2$.

5. The method of claim 4 wherein the concentration of said $H_2O_2$ in said scrubber solution is from about 0.5 to about 5 wt %.

6. The method of claim 1 wherein said scrubber solution flows countercurrently to said effluent.

7. The method of claim 1 wherein said scrubber solution contains about 1 wt % each of NaOH and $H_2O_2$ and said scrubber solution contacts said effluent in a packed scrubber tower.

8. The method of claim 1 wherein said effluent is first contacted with a pre-scrubber solution consisting essentially of an aqueous alkaline solution.

9. The method of claim 8 wherein said pre-scrubber has a pH in the range of about 8 to about 14.

* * * * *